(12) United States Patent
Wilson et al.

(10) Patent No.: US 9,001,446 B1
(45) Date of Patent: Apr. 7, 2015

(54) SYSTEM AND METHOD FOR POWER SAVING MODES IN MULTI-SENSOR MAGNETIC RECORDING

(71) Applicant: LSI Corporation, San Jose, CA (US)

(72) Inventors: Bruce A. Wilson, San Jose, CA (US); Richard Rauschmayer, Longmont, CO (US); Peter J. Windler, Fort Collins, CO (US); Jefferson E. Singleton, Longmont, CO (US); Shaohua Yang, San Jose, CA (US); Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/194,069

(22) Filed: Feb. 28, 2014

Related U.S. Application Data

(60) Provisional application No. 61/936,702, filed on Feb. 6, 2014.

(51) Int. Cl.
*G11B 5/09* (2006.01)
*G11B 5/596* (2006.01)
*G11B 20/10* (2006.01)

(52) U.S. Cl.
CPC ...... *G11B 5/59616* (2013.01); *G11B 20/10037* (2013.01)

(58) Field of Classification Search
None
See application file for complete search history.

(56) References Cited

U.S. PATENT DOCUMENTS

| | | | |
|---|---|---|---|
| 5,317,459 A * | 5/1994 | Ukai | 360/69 |
| 5,825,318 A * | 10/1998 | Patapoutian et al. | 341/131 |
| 6,553,501 B1 | 4/2003 | Yokoe | |
| 7,002,884 B2 | 2/2006 | Schmidt et al. | |
| 7,324,036 B2 | 1/2008 | Petre et al. | |
| 7,340,616 B2 | 3/2008 | Rothman et al. | |
| 7,751,139 B1 * | 7/2010 | Voo | 360/66 |
| 7,893,674 B2 | 2/2011 | Mok et al. | |
| 8,711,517 B2 * | 4/2014 | Erden et al. | 360/121 |
| 2005/0174669 A1 * | 8/2005 | Contreras et al. | 360/46 |
| 2010/0020435 A1 * | 1/2010 | Chen et al. | 360/77.02 |

OTHER PUBLICATIONS

Nie, et al., A Tutorial on Control Design of Hard Disk Drive Self-Servo Track Writing, Manuscript received Sep. 15, 2009, Online at: http://www.me.berkeley.edu/~horowitz/Publications_files/All_papers_numbered/186c_Nie_ACC10_TutorialonSSTW.pdf, pp. 1-10.

* cited by examiner

*Primary Examiner* — Peter Vincent Agustin
(74) *Attorney, Agent, or Firm* — Suiter Swantz pc llo (57) ABSTRACT

A system and method for power management in a hard disk drive (HDD) assembly incorporating two or more read sensors includes directing a read/write head to follow a track; depowering one or more read sensors and readpath circuits associated with the read sensors; reading an analog readback signal through the first read sensor; processing the signal through an analog front-end to generate an input signal; sampling the input signal through an analog to digital converter at a first frequency to generate a first sampling signal; sampling the input signal through a second analog to digital converter at a second frequency to generate a second sampling signal; and generating a digital output signal from either or both sampling signals at a third sampling frequency through a digital signal processor. The method may additionally comprise adjusting a sampling frequency when power level reaches a threshold.

16 Claims, 10 Drawing Sheets

SYSTEM AND METHOD FOR POWER SAVING MODES IN MULTI-SENSOR MAGNETIC RECORDING

CROSS-REFERENCE TO RELATED APPLICATIONS

This application claims priority under 35 U.S.C. §119(e) to provisional patent application No. 61/936,702 filed on Feb. 6, 2014. Said application is herein incorporated by reference in its entirety.

TECHNICAL FIELD

The present invention relates to data storage systems, specifically magnetic recording disk drives.

BACKGROUND

Hard disk drive (HDD) systems are being developed in which multiple read sensors read a single recorded track. In such an HD assembly, readback signals from multiple sensors can be processed jointly to yield an equalized signal with better signal to noise ratio than if only a single read sensor were used. Processing multiple readback signals, however, requires additional analog and digital circuitry, which in turn consumes more power than a comparable read channel processing only a single readback signal.

In some applications it may be desirable to revert to a low power mode utilizing only a single readback sensor by disabling additional circuitry associated with the second read sensor.

SUMMARY

Embodiments of the present disclosure are directed to a system and method for power management in a hard disk drive (HDD) assembly incorporating two or more read sensors. In embodiments, multiple power-saving or low-power modes of operation are available with varying power and performance tradeoffs for servo processing and data recovery. For example, a HDD controller may direct a read/write head to follow a recorded track (track following) even though no read or write operations are taking place (idle mode).

In embodiments, low power modes of operation can be used for track following in idle mode, trading reduced power consumption for reduced servo processing performance (including servo detectors and servo demodulators). In one aspect, in a low power mode one or more read sensors may be deactivated or depowered so that only a single read sensor remains active. In another aspect, in a low power mode some or all of the readpath circuitry associated with a read sensor, e.g., analog to digital converters (ADCs), preamplifiers, analog front-end (AFE) circuits, and digital signal processors, may be deactivated or depowered. In a further aspect, in a low power mode servo processing signals may be sampled at a reduced rate. In a still further aspect, in a low power mode servo processing circuitry may read only a subset of all servo information.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1A:
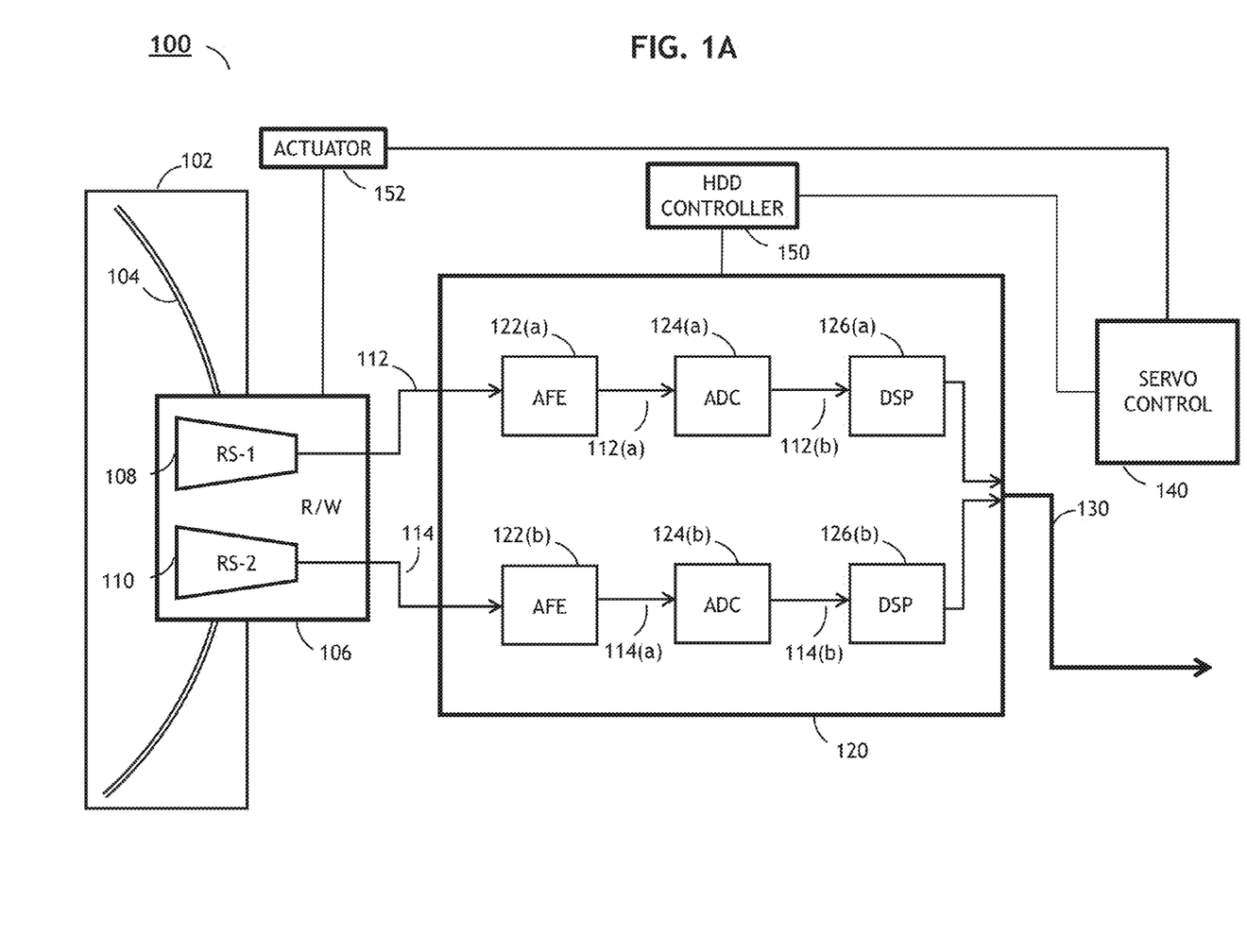
FIG. 1A is a block diagram of an HDD assembly reading user data through multiple read sensors.

FIG. 1A illustrates an embodiment of HDD assembly 100 operating in a data detection mode. In embodiments, HDD assembly 100 can include read sensors 108 and 110 incorporated into read/write head 106, positioned over recorded track 104 of hard disk 102. Actuator 152 can move read/write head 106 to a new position based on output from servo controller 140. Embodiments of HDD assembly 100 can operate in various data detection or servo modes including read, write, sleep, standby, idle, and low power. HDD controller 150 can seamlessly transition between available modes or power states based on pre-determined criteria or on workload. For example, if a specified period of time passes without a read or write command, the HDD can transition to a lower power state. When HDD assembly 100 is operating in a read mode, read sensors 108 and 110 translate magnetic flux changes on track 104 into analog readback signals 112 and 114, representing user data recorded on track 104 of disk 102. Read channel 120 receives readback signals 112 and 114 from read sensors 108 and 110 respectively. Readback signals 112 and 114 are first processed by analog front end (AFE) circuits 122(a) and 122(b), which generates input signals 112(a) and 114(a). AFE circuits 122(a), 122(b) can include preamplifier circuitry, automatic gain control circuitry, variable gain multipliers, programmable gain amplifiers, and other like integrated circuitry. Analog to digital converters (ADCs) include circuitry for sampling input signals 112(a) and 114(a) and generating sampling signals 112(b) and 114(b). Digital signal processor (DSP) 126 can include circuitry for combining sampling signals and generating digital output signal 130, representing user data recorded on track 104.

Figure 1B:
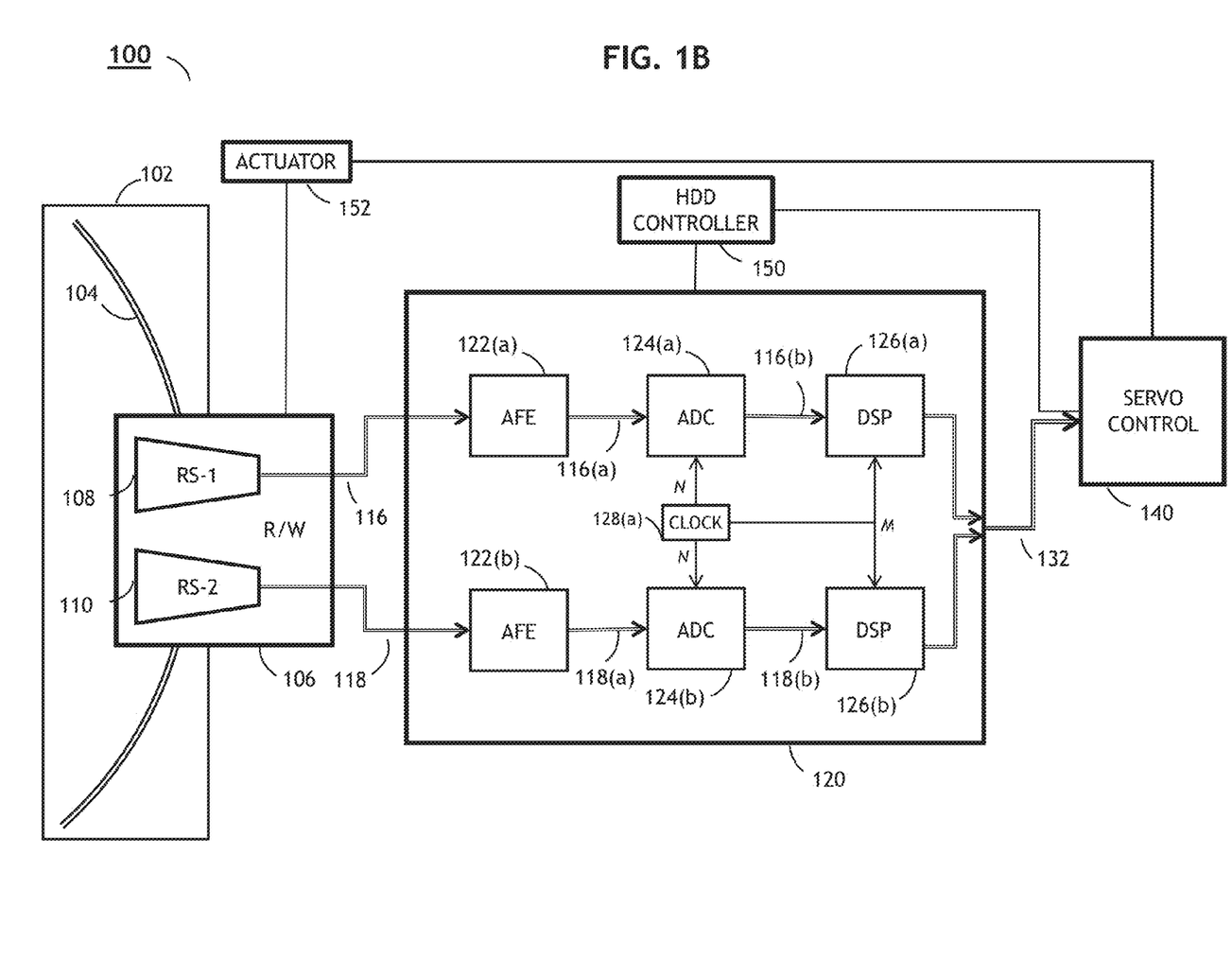
FIG. 1B is a block diagram of an HDD assembly reading servo information through multiple read sensors.

FIG. 1B illustrates an embodiment of HDD assembly 100 operating in a servo mode. In embodiments, read sensors 108 and 110 may read servo information from disk 102 instead of user data. Servo information can include servo patterns or any like information written to disk 102 in order to guide servo controller 140 in directing read/write head 106 to a desired location on disk 102. In some embodiments, servo controller 140 can include servo detectors, demodulators, and other like processors and circuitry associated with servo management. For example, when HDD assembly 100 is operating in idle mode, and no read/write operation is taking place, read sensors 108 and 110 may read servo information from track 104 of disk 102 and generate analog readback signals 116 and 118. AFE circuits 122(a) and 122(b) of read channel 120 may then receive analog readback signals 116 and 118 from read sensors 108 and 110. Embodiments of ADCs 124(a) and 124(b) can receive input signals 116(a) and 118(a) from AFE circuits 122(a) and 122(b) and generate sampling signals 116(b) and 118(b), which are combined by DSP 126 into digital servo output signal 132, which is received by servo controller 140. ADCs 124(a) and 124(b) sample input signals 116(a) and 118(a) at a sampling rate N determined by clock generator 128(a); DSP 126 combines sampling signals 116(b) and 118(b) at a sampling rate M also determined by clock generator 128(a). In some embodiments, servo controller 140 includes processors and circuitry for automatically and seamlessly switching from a first mode to a second mode based on the quality of digital output signals 130 and 132 or other like metrics.

Figure 2:
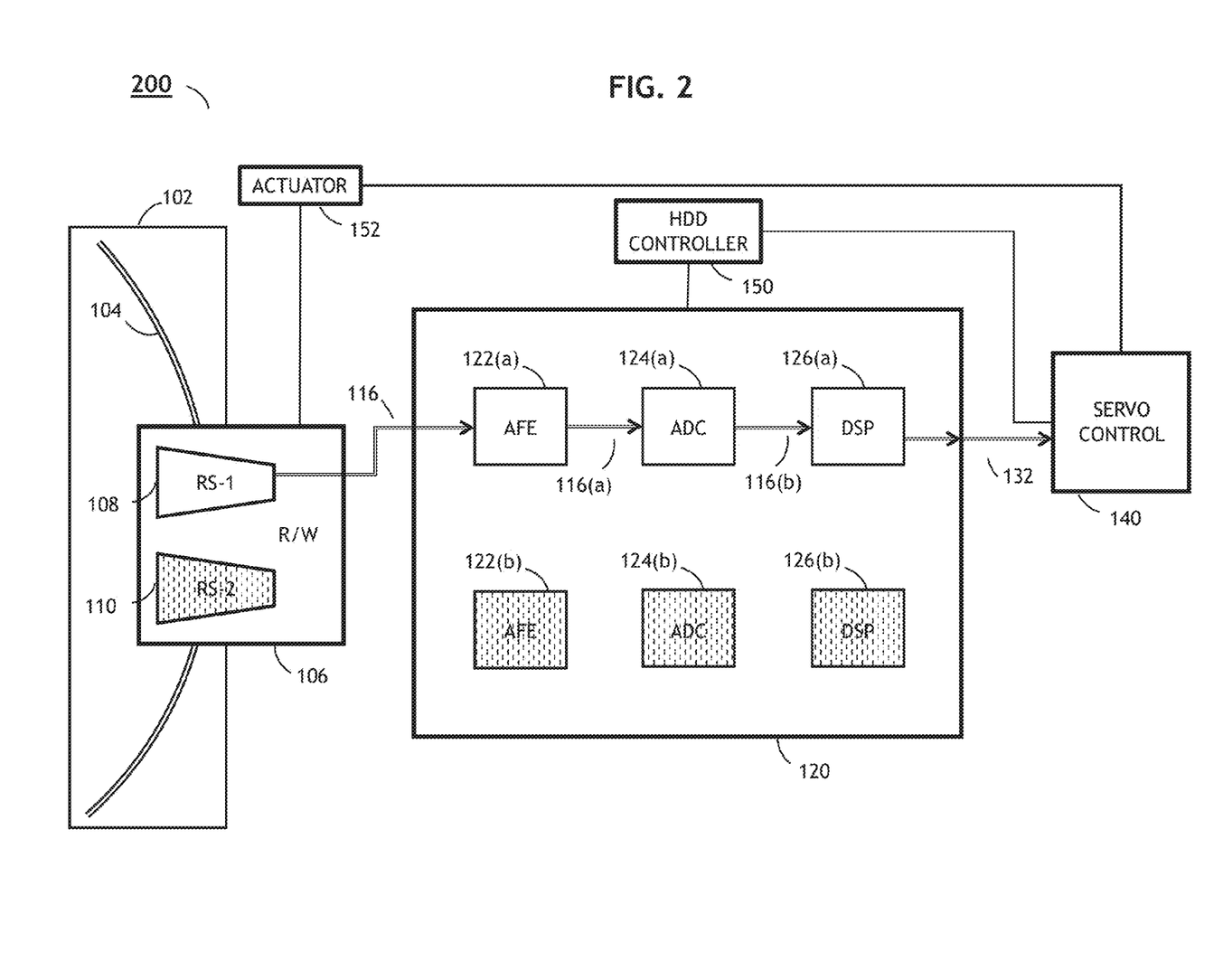
FIG. 2 is a block diagram of an HDD assembly operating in a low power servo mode according to an embodiment of the present invention.

Peak performance, i.e., optimum accuracy, may be critical during media writing operations. However, in some cases reducing power consumption may be a higher priority than system performance. FIG. 2 illustrates an embodiment of HDD assembly 200 operating in a low power servo mode according to the present invention. Embodiments of HDD assembly 200 may operate in idle mode, where servo controller 140 directs read/write head 106 to continue following track 104 of disk 102, even though no read or write operations are taking place and read sensor 110 is depowered. Idle mode operation is common during typical mobile hard disk drive workloads and represents a large part of the power benchmark. In some embodiments, HDD assembly 200 can additionally conserve power by deactivating or depowering read sensor 108 after a servo event so that no read sensor remains active. In some embodiments, all readpath circuitry associated with deactivated read sensor 110 can be depowered, including AFE 122(b) and ADC 124(b). In subsequent servo events after read sensor 110 and associated electronics are depowered, active read sensor 108 can read servo information from track 104 and generate an analog readback signal, which is processed by active circuitry 122(a), 124(a), 126 of read channel 120. Servo controller 140 then receives a digital servo signal 132 from active DSP 126 of read channel 120.

Figure 3:
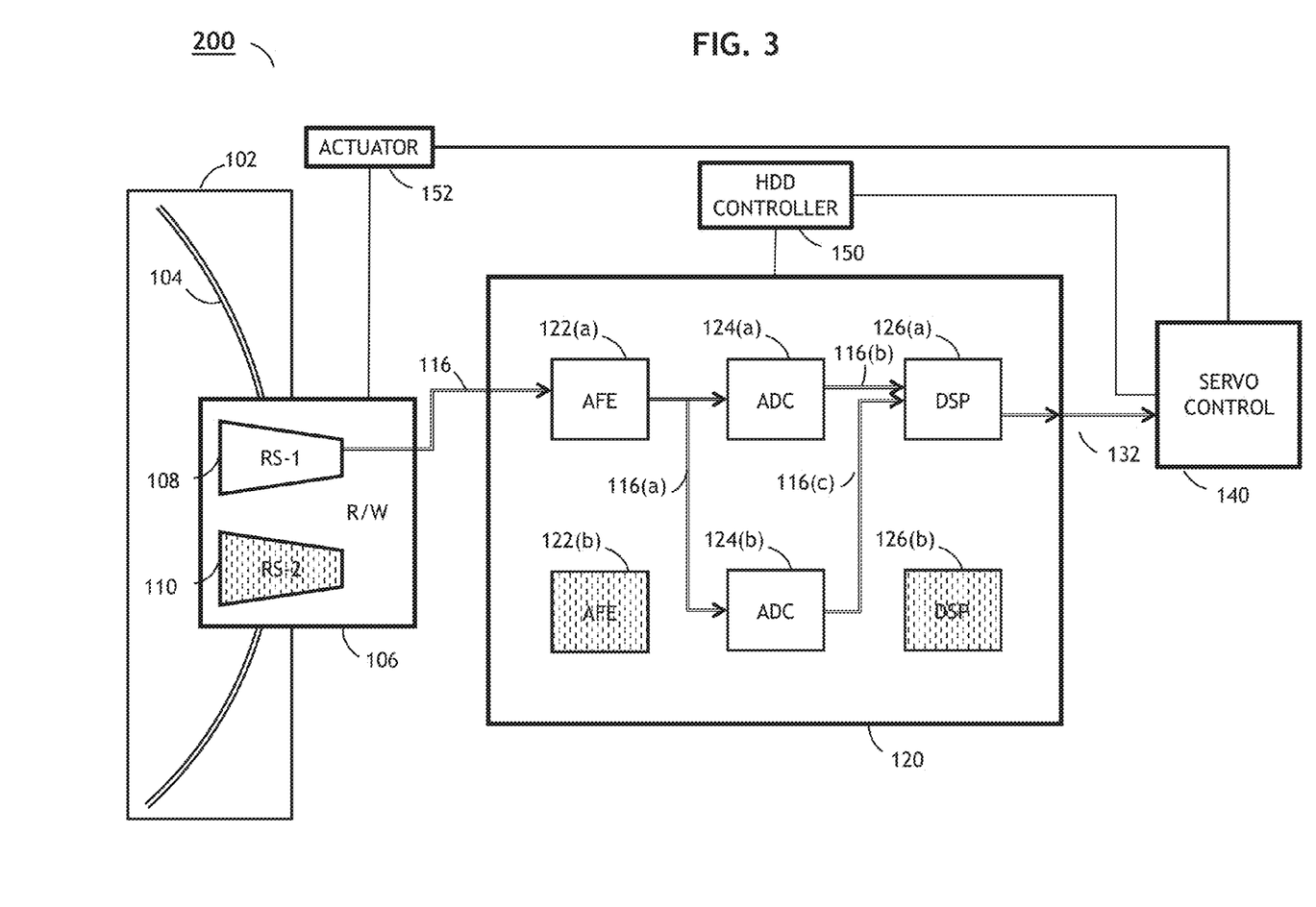
FIG. 3 is a block diagram of an HDD assembly operating in a low power servo mode according to an embodiment of the present invention.

In some embodiments, HDD controller 150 can deactivate only a portion of electronics associated with a deactivated read sensor. FIG. 3 illustrates an embodiment of an HDD assembly 200 operating in a low power servo mode according to the present invention; read sensor 110, and associated AFE circuits 122(b), are deactivated. AFE 122(a) of read channel 120 can receive analog readback signal 116 representing servo information from read sensor 108. Multiple ADCs 124(a) and 124(b) of read channel 120 can remain active, sampling input signal 116(a) to generate sampling signals 116(b) and 116(c). DSP 126 then combines sampling signals 116(b) and 116(c) to generate digital servo signal 132, which is received by servo controller 140.

Figure 4A:
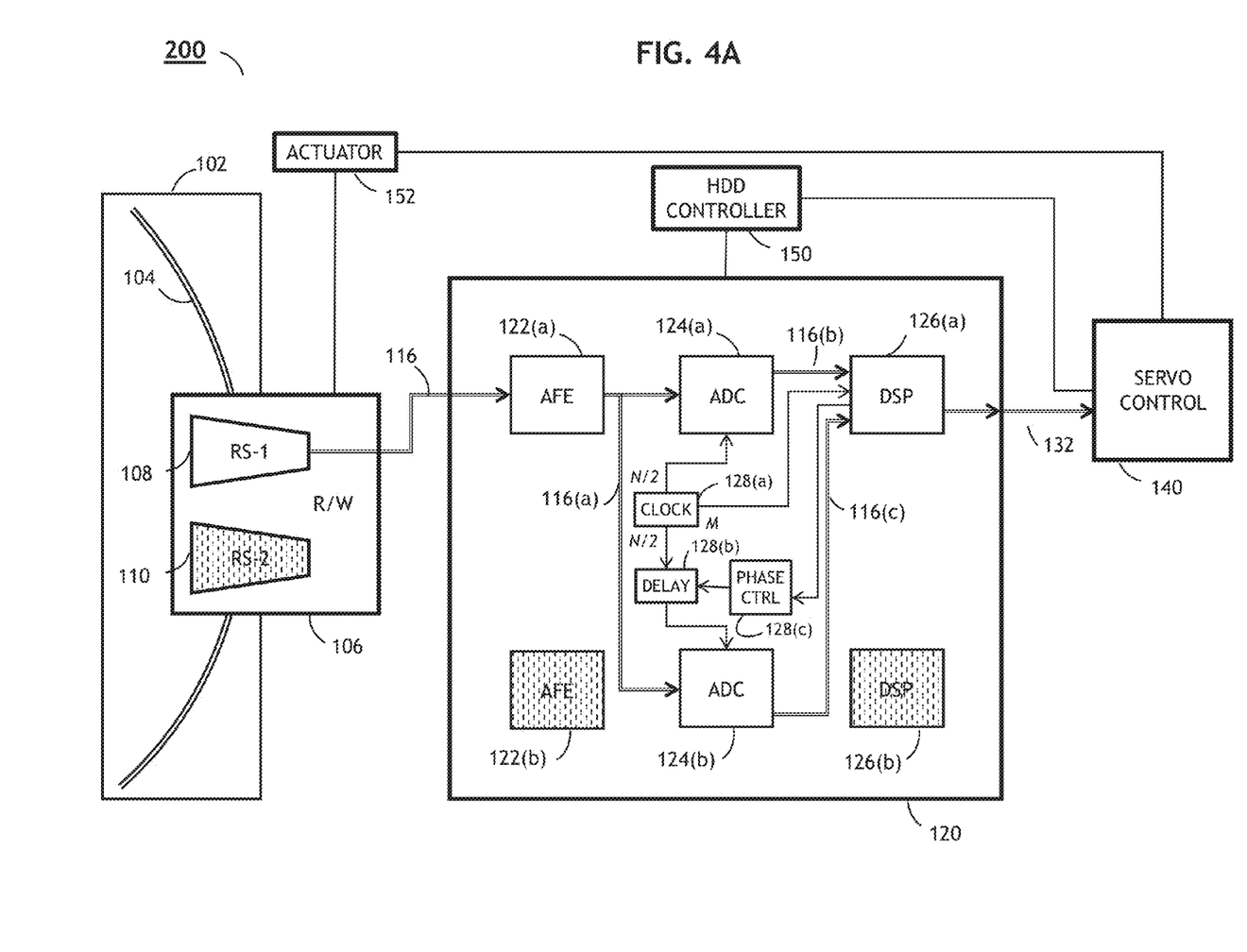
FIG. 4A is a block diagram of an HDD assembly operating in a low power servo mode according to an embodiment of the present invention.

In some embodiments, HDD assembly 200 can operate in a low power mode that conserves power by reducing the sampling rate of user data or servo signals. Referring to FIG. 4A, active ADCs 124(a) and 124(b) sample input signal 116 (a) at a rate 2N determined by clock generator 128(a). In embodiments, delay block 128(b) and phase control block 128(c) align the sampling phase of ADC 124(b) so that DSP 126 receives a sample from ADC 124(b) precisely between two samples from ADC 124(a). For example, phase alignment can be tuned by taking the phase measurement of a known pattern, such as the preamble field used by HDD assembly 200, and adjusting the delay to achieve the desired phase offset. Consequently, DSP 126 can alternate between sampling signal 116(b) from ADC 124(a) and sampling signal 116(c) from ADC 124(b) when combining sampling signals into digital output signal 132; ADCs 124(a) and 124(b) sample input signal 116(a) at an effective sampling rate 2N half their normal rate. In some embodiments, if the sampling rate is sufficiently above the bandwidth of input signal 116(a), delay block 128(b) can be removed and phase control block 128(c) used by DSP 126 to integrate phase control into sample combine filtering via digital interpolation.

Figure 4B:
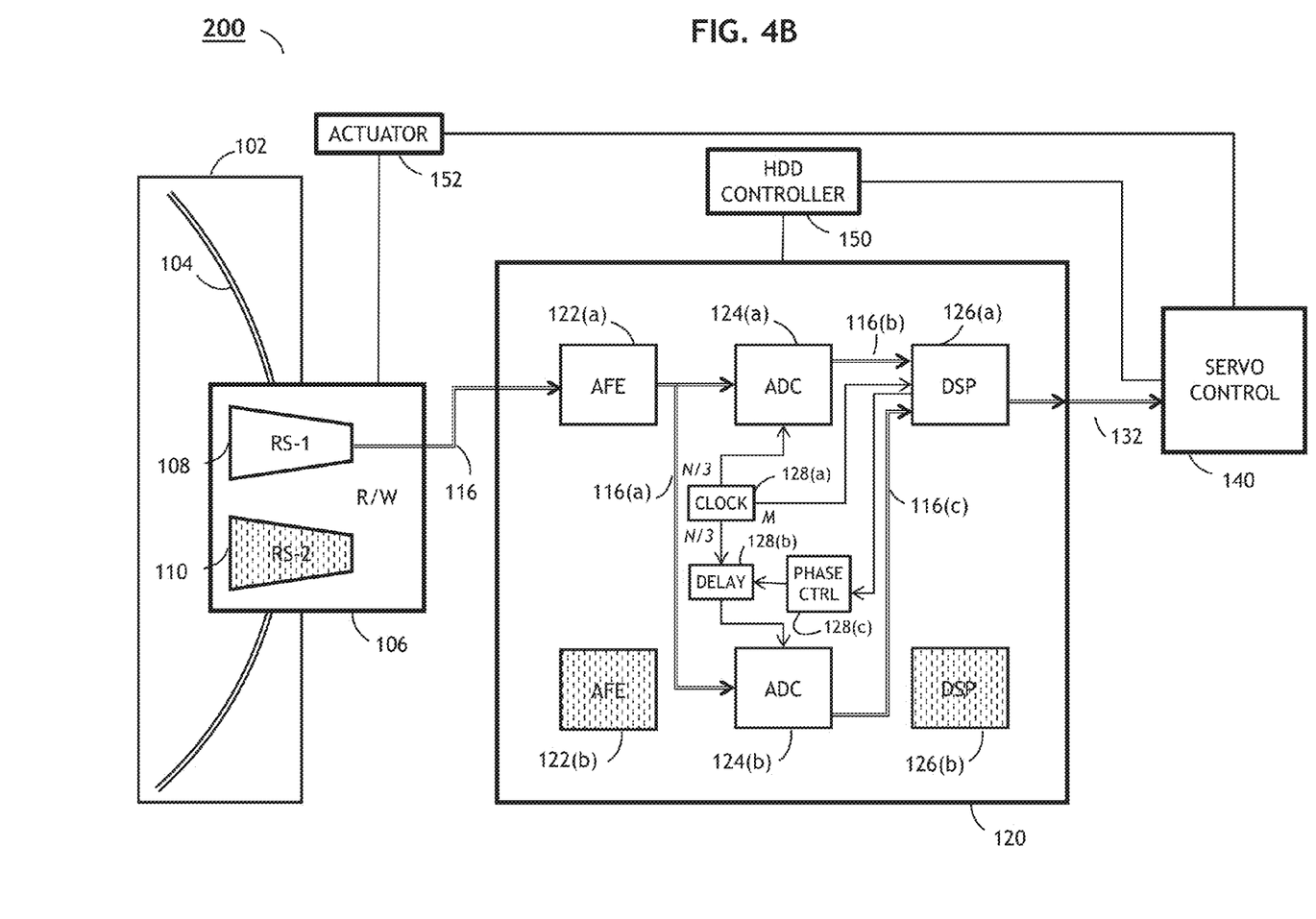
FIG. 4B is a block diagram of an HDD assembly operating in a low power servo mode according to an embodiment of the present invention.

FIG. 4B illustrates an embodiment of HDD assembly 200 operating in a low power mode according to the present invention that reduces the effective sampling rate of multiple ADC circuits below the normal sampling rate of a single ADC, thereby reducing the effective power consumption of the set of multiple ADCs. The dynamic power usage of an ADC circuit is generally a linear function of its sampling rate; therefore the dynamic power is unchanged by a simple reduction in sampling rate. Furthermore, the static power of two ADCs is double the power associated with running a single ADC at twice the sampling rate. In some embodiments, "underclocking" ADCs in this way can trade reduced power for higher signal noise in the digital domain due to aliasing, if power conservation is a desirable priority. Referring to FIG. 4B, embodiments of ADCs 124(a) and 124(b) can sample input signal 116 at sampling rate 3N determined by clock generator 128(a). The effective sampling rate of each ADC is then reduced to one-third its normal rate, and thus the combined effective sample rate of ADCs 124(a) and 124(b) is less than that of a single ADC sampling at its normal rate N, resulting in a net power savings. In embodiments, servo controller 140 can define a power threshold, and HDD controller 155 can then switch to a low power servo mode if power consumption reaches the threshold.

Figure 5A:
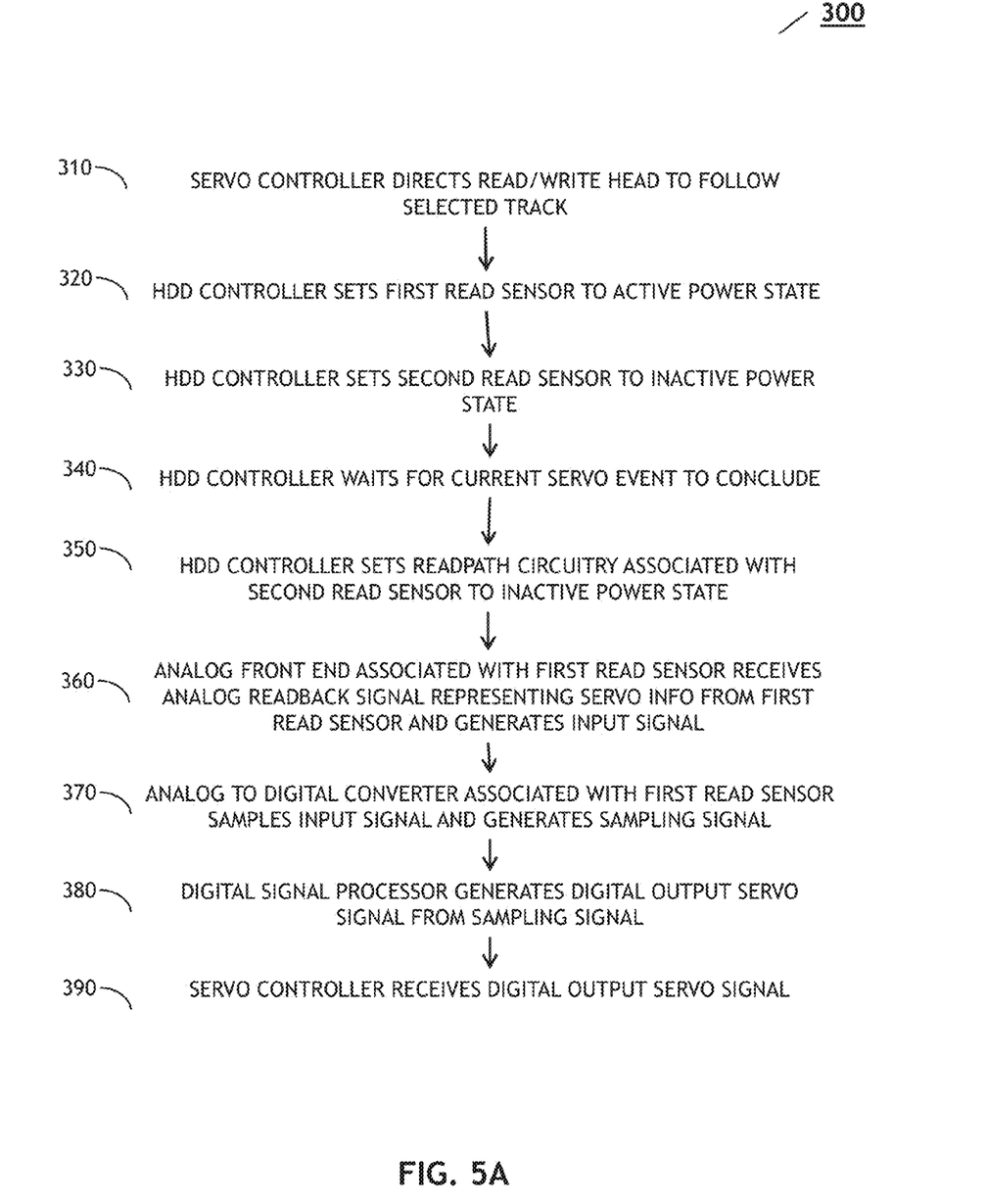
FIG. 5A is a flow diagram illustrating a method of power saving in accordance with an embodiment of the present invention.

FIGS. 5A through 5D illustrate a method 300 of power management according to the present invention in an HDD assembly incorporating two or more read sensors. FIG. 5A illustrates a low power servo mode in which a second read sensor and its associated circuitry are deactivated. At step 310, servo controller 140 directs read/write head 106 to follow track 104 of disk 102. At step 320, HDD controller 150 sets first read sensor 108 to an active power state. At step 330, HDD controller 150 sets second read sensor 110 is set to an inactive power state if it is not already deactivated. At step 340, HDD controller 150 waits for the current servo event to conclude. At step 350, HDD controller 150 sets readpath circuitry (including AFE 122(b) and ADC 124(b)) to an inactive power state if it is not already deactivated. At step 360, AFE 122(a) associated with first read sensor 108 receives analog readback signal 116 representing servo information from first read sensor 108 and generates input signal 116(a).

At step 370, ADC 124(a) associated with first read sensor 108 samples input signal 116(a) and generates sampling signal 116(b). At step 380, DSP 126 associated with first read sensor 108 generates digital output servo signal 132 from sampling signal 116(b). Finally, at step 390, servo controller 140 receives digital output servo signal 132 for processing. In embodiments, servo controller 140 may read only a portion of the information conveyed by digital output servo signal 132.

Figure 5B:
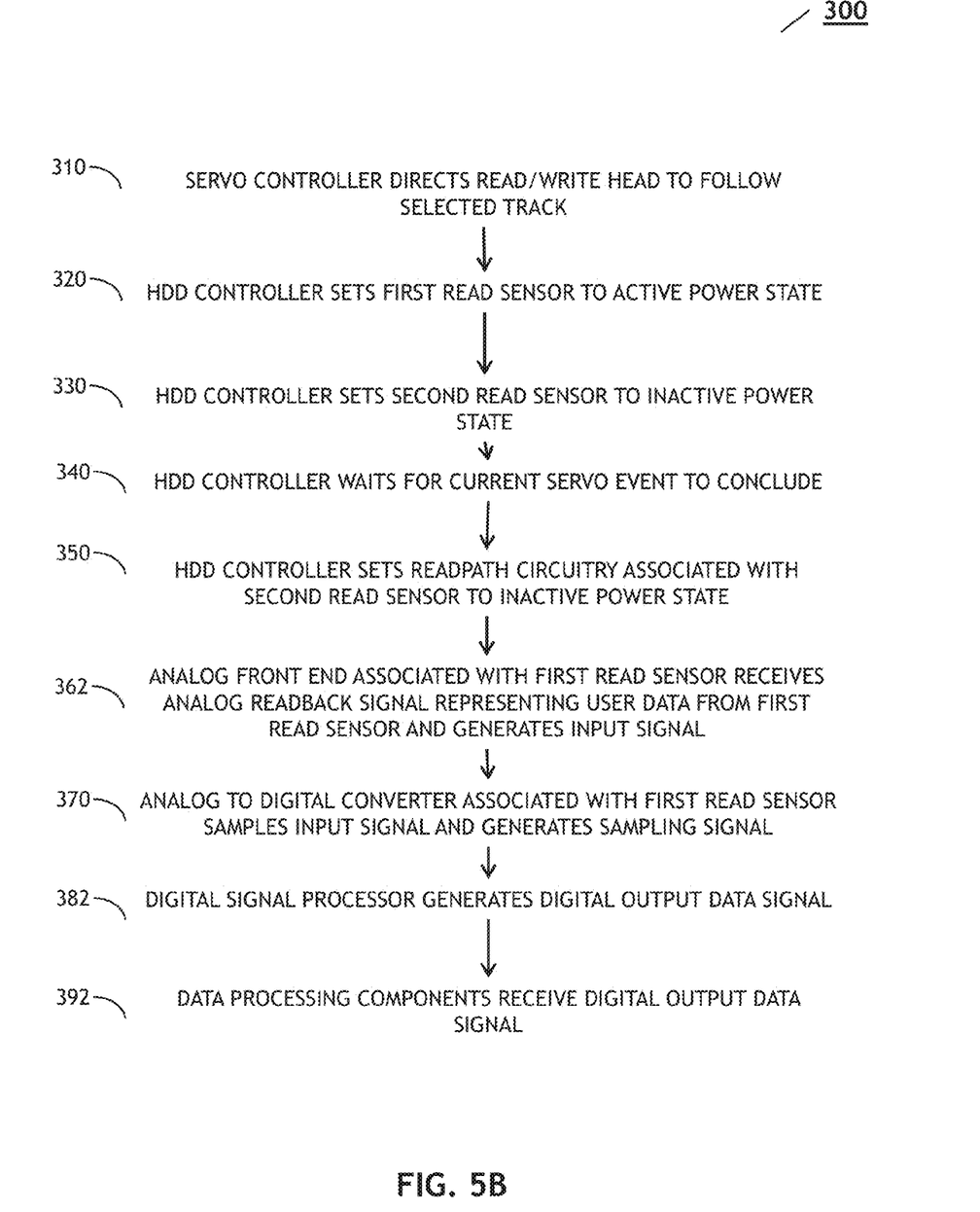
FIG. 5B is a flow diagram illustrating a method of power saving in accordance with an embodiment of the present invention.

FIG. 5B illustrates a low power data detection mode in which a read sensor and its associated circuitry are deactivated. At step 362, AFE 122(a) associated with first read sensor 108 receives an analog readback signal 112 representing user data from first read sensor 108 and generates input signal 112(a). At step 382, DSP 126 generates a digital output data signal 130 from sampling signal 112(b). Finally, at step 392, data processing components connected to read channel 120 receive digital output data signal 130 for processing.

Figure 5C:
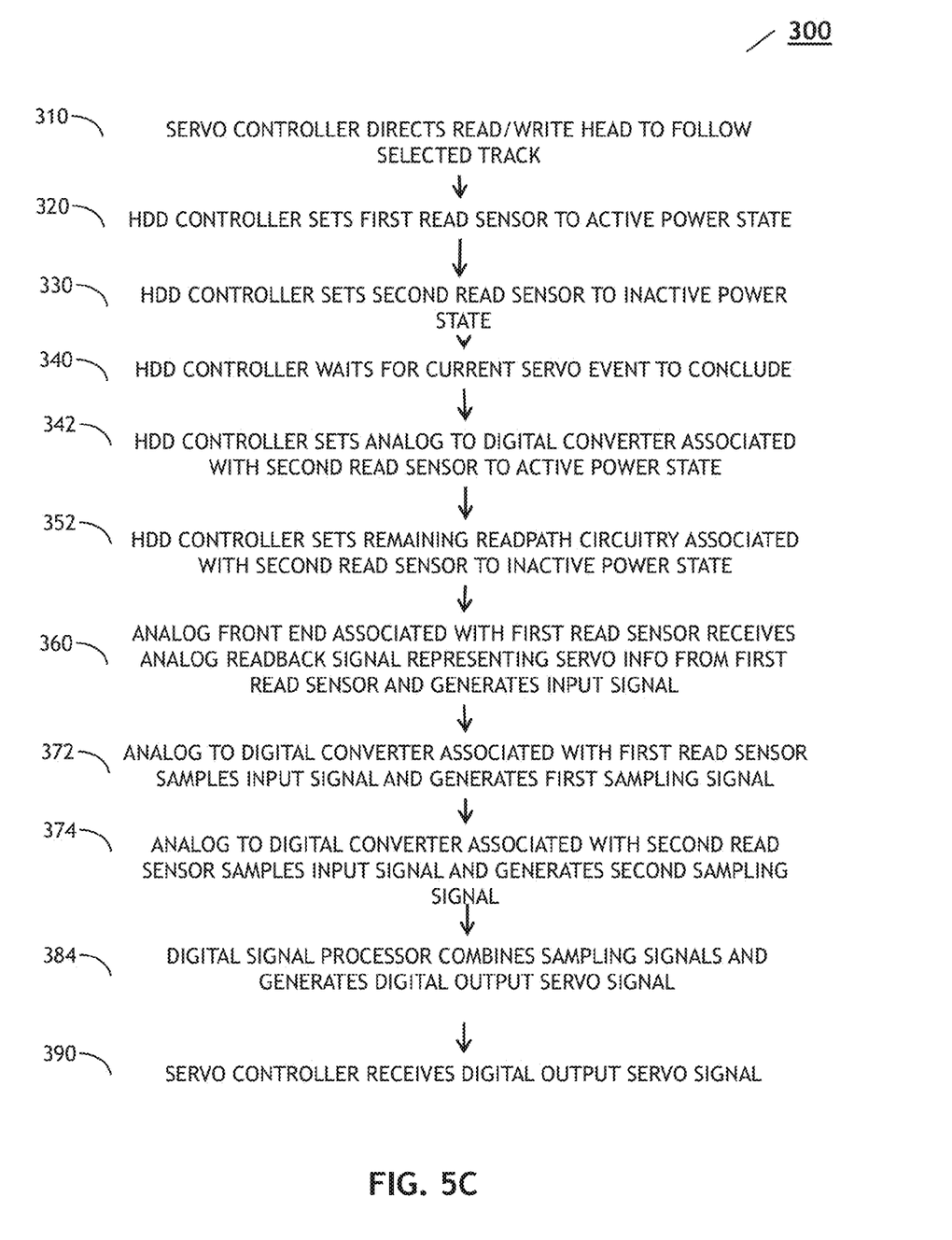
FIG. 5C is a flow diagram illustrating a method of power saving in accordance with an embodiment of the present invention.

FIG. 5C illustrates a low power servo mode in which a portion of circuitry associated with deactivated second read sensor are deactivated and servo signals are sampled at a reduced rate to conserve power. At step 342, HDD controller 150 sets ADC 124(b) associated with second read sensor 110 to an active power state if it is not already activated. At step 352, HDD controller sets remaining readpath circuitry (including AFE 122(b)) to an inactive power state if it is not already deactivated. At step 372, ADC 124(a) associated with first read sensor 108 samples input signal 116(a) from AFE 122(a) and generates first sampling signal 116(b). At step 374, ADC 124(b) associated with second read sensor 110 samples input signal 116(a) from AFE 122(a) and generates second sampling signal 116(c). At step 384, DSP 126 combines sampling signals 116(b) and 116(c) and generates digital output servo signal 132.

Figure 5D:
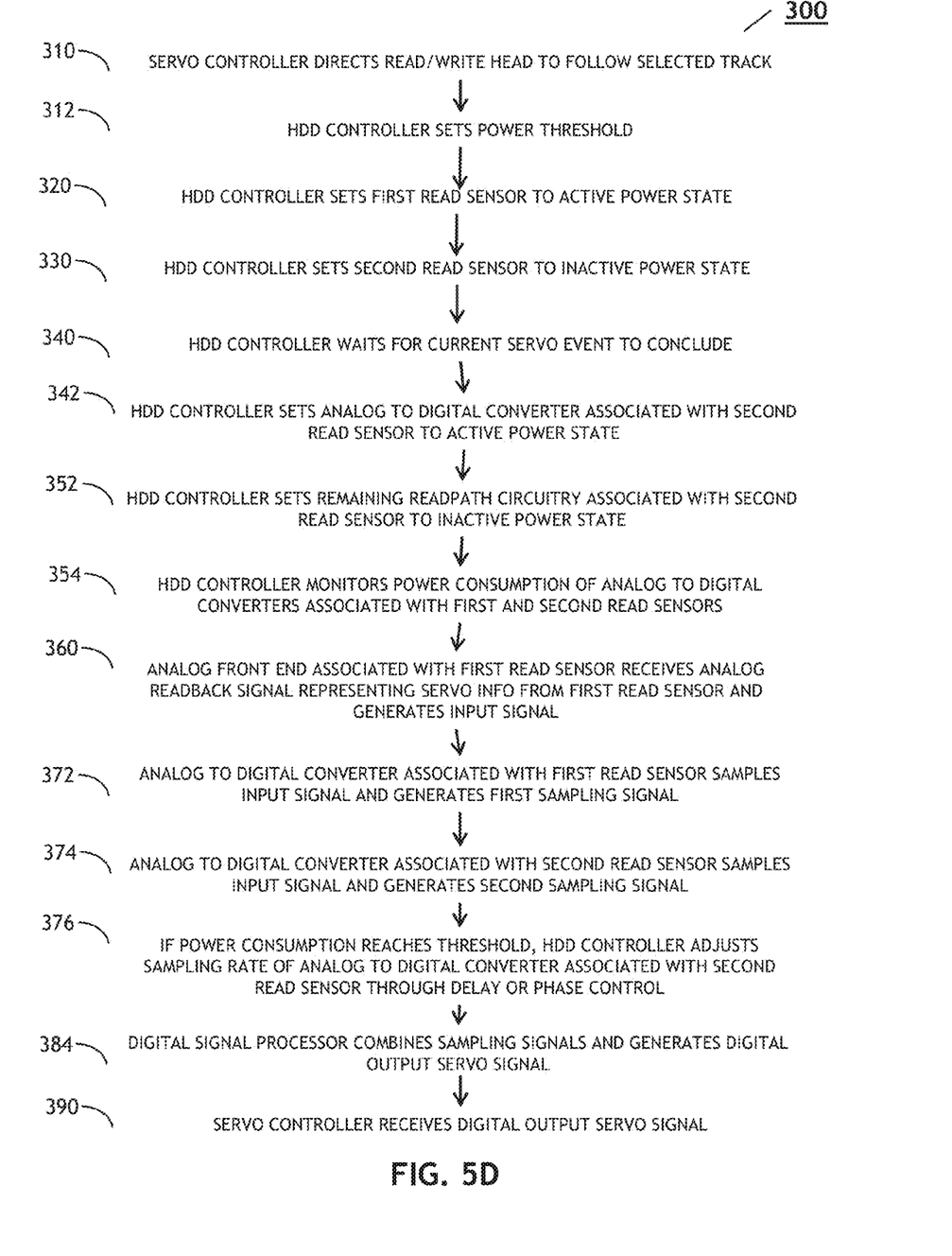
FIG. 5D is a flow diagram illustrating a method of power saving in accordance with an embodiment of the present invention.

In some embodiments read channel 120 can be programmed by HDD controller 150 with a predetermined power threshold, deactivating components or adjusting sampling rates if power consumption reaches the threshold. FIG. 5D illustrates a low power servo mode in which sampling rates are reduced if power consumption reaches a threshold. At step 312, HDD controller 150 sets a power threshold. At step 354, HDD controller 150 monitors the power consumption of ADCs 124(a) and 124(b) associated with first and second read sensors 108 and 110 respectively. At step 374, if the power consumption of ADCs 124(a) and 124(b) reaches the threshold, HDD controller 150 adjusts the sampling rate of ADC 124(b) through delay block 128(b) or phase control block 128(c) in order to reduce the effective sampling rate of ADCs 124(a) and 124(b) and conserve power.

It should be recognized that the various functions, operations, or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for power management in a hard disk drive (HDD) assembly, comprising:
    at least one disk, the disk including at least one track;
    at least one read sensor including at least a first read sensor and a second read sensor, operably coupled to a read/write head and configured to read the at least one track and generate an analog readback signal;
    a read channel including
        at least one readpath including at least a first readpath and a second readpath, each readpath communicatively coupled to the at least one read sensor and including an analog front-end including a plurality of analog front-end circuits, the plurality of analog front-end circuits collectively configured to receive the analog readback signal and generate an input signal, and an analog to digital converter configured to sample the input signal at a first sampling rate and generate a sampling signal, and
        at least one digital signal processor configured to combine at least one sampling signal at a second sampling rate and generate a digital output signal;
    a servo controller communicatively coupled to the read/write head, configured to position the read/write head on the at least one track and process at least one digital output signal received from the read channel;
    an HDD controller communicatively coupled with the read channel and configured to set a power state of the at least one read sensor, determine a mode of operation for the HDD assembly, and switch from a first mode of operation to a second mode of operation; and
    a clock generator communicatively coupled to the HDD controller, configured to determine at least one of the first sampling rate and the second sampling rate.

2. The system of claim 1, wherein the analog readback signal corresponds to encoded instructions directing the servo controller to perform at least one task.

3. The system of claim 1, wherein the analog readback signal corresponds to user data recorded on the at least one disk.

4. The system of claim 1, further comprising:
    a delay block communicatively coupled to the clock generator and to at least one analog to digital converter of the at least one readpath, and configured to adjust the first sampling rate.

5. The system of claim 1, further comprising:
    a phase control block communicatively coupled to the at least one digital signal processor configured to adjust the second sampling rate.

6. The system of claim 1, wherein the HDD controller is further configured to
set a power state of the at least one readpath;
set a power state of at least one of an analog front-end circuit and an analog to digital converter of the at least one readpath; and
direct the clock generator to adjust at least one of the first sampling rate and the second sampling rate.

7. The system of claim 1, wherein the HDD controller is further configured to
set a threshold;
monitor a power level of at least one analog to digital converter of the at least one readpath; and
direct the clock generator to adjust at least one of the first sampling rate and the second sampling rate if the power level reaches the threshold.

8. A method for power management in a hard disk drive (HDD) assembly including at least one disk, the disk including at least one track, and at least a first read sensor and a second read sensor, comprising:
directing a read/write head including the first read sensor and the second read sensor to follow a track of the at least one disk;
setting the first read sensor to an active power state;
setting the second read sensor to an inactive power state;
setting all readpath circuits associated with the second read sensor to an inactive power state;
reading at least one analog readback signal through the first read sensor;
processing the analog readback signal through an analog front-end including at least one analog front-end circuit to generate at least one input signal;
sampling the at least one input signal through a first analog to digital converter at a first frequency to generate a first sampling signal; and
generating a digital output signal from the first sampling signal through a digital signal processor.

9. The method of claim 8, wherein the at least one analog readback signal corresponds to at least one of servo information and user data recorded on the track.

10. The method of claim 9, further comprising:
receiving the digital output signal through a servo controller.

11. The method of claim 8, wherein the readpath circuits include at least one of an analog front-end circuit and an analog to digital converter.

12. The method of claim 8, further comprising:
setting at least one second analog to digital converter associated with the second read sensor to an active power state;
sampling the at least one input signal through the second analog to digital converter at a second frequency to generate a second sampling signal; and
combining the first sampling signal and the second sampling signal through the digital signal processor at a third frequency to generate a digital output signal.

13. The method of claim 12, further comprising:
adjusting at least one of the first frequency, the second frequency, and the third frequency.

14. The method of claim 13, further comprising:
setting a threshold;
monitoring a power level of at least one of the first analog to digital converter and the second analog to digital converter; and
adjusting at least one of the first frequency, the second frequency, and the third frequency when the power level reaches the threshold.

15. A non-transitory computer-readable storage medium bearing instructions encoded thereon, said instructions executable by a computing device or processor to implement a method for power management in a hard disk drive (HDD) assembly including at least a first read sensor and a second read sensor, the method comprising:
directing a read/write head including the first read sensor and the second read sensor to follow a track of the at least one disk;
setting the first read sensor to at least one of an active power state and an inactive power state;
setting the second read sensor to at least one of an active power state and an inactive power state;
setting at least one readpath circuit associated with the second read sensor to at least one of an active power state and an inactive power state;
reading at least one analog readback signal through the first read sensor; and processing the analog readback signal through at least one analog front-end circuit to generate at least one input signal;
sampling the at least one input signal through a first analog to digital converter at a first frequency to generate a first sampling signal;
sampling the at least one input signal through a second analog to digital converter at a second frequency to generate a second sampling signal;
generating a digital output signal from the first sampling signal through a digital signal processor; and
combining the first sampling signal and the second sampling signal through a digital signal processor at a third frequency to generate a digital output signal.

16. The non-transitory computer-readable storage medium of claim 15, further comprising instructions for:
setting a threshold;
monitoring a power level of at least one of the first analog to digital converter and the second analog to digital converter; and
adjusting at least one of the first frequency, the second frequency, and the third frequency.

* * * * *